United States Patent [19]

Nakajima et al.

[11] Patent Number: 4,904,553
[45] Date of Patent: Feb. 27, 1990

[54] POLYANILINE

[75] Inventors: Tadashi Nakajima, Tokyo; Shinichi Toyosawa; Shigeru Kijima, both of Tokorozawa; Katsuhiko Arai, Iruma; Yuko Maeda, Akishima; Masao Ogawa, Kawagoe; Takahiro Kawagoe, Tokorozawa; Yasuhiro Iino; Ryuzo Osawa, both of Kodaira; Yuichi Ishino, Fuchu, all of Japan

[73] Assignee: Bridgestone Corporation, Tokyo, Japan

[21] Appl. No.: 211,059

[22] Filed: Jun. 24, 1988

Related U.S. Application Data

[63] Continuation-in-part of Ser. No. 169,881, Mar. 18, 1988.

[30] Foreign Application Priority Data

| Apr. 16, 1987 | [JP] | Japan | 62-93962 |
| May 21, 1987 | [JP] | Japan | 62-124921 |
| May 21, 1987 | [JP] | Japan | 62-124922 |
| Jul. 1, 1987 | [JP] | Japan | 62-164968 |
| Sep. 22, 1987 | [JP] | Japan | 62-238168 |
| Oct. 2, 1987 | [JP] | Japan | 62-249146 |
| Nov. 19, 1987 | [JP] | Japan | 62-292391 |
| Dec. 3, 1987 | [JP] | Japan | 62-306715 |
| Feb. 10, 1988 | [JP] | Japan | 63-29707 |

[51] Int. Cl.$^4$ ............................................. H01M 4/60
[52] U.S. Cl. .................................... 429/213; 252/500
[58] Field of Search ................ 429/194, 213; 252/500

[56] References Cited

U.S. PATENT DOCUMENTS

| 4,321,114 | 3/1982 | MacDiarmid et al. |
| 4,442,187 | 4/1984 | MacDiarmid et al. |
| 4,695,521 | 9/1987 | Shacklette et al. |
| 4,728,589 | 3/1988 | MacDiarmid et al. |
| 4,740,436 | 4/1988 | Kobayashi et al. ............ 429/213 |

FOREIGN PATENT DOCUMENTS 210023 10/1986 European Pat. Off.
3615975 11/1986 Fed. Rep. of Germany.

OTHER PUBLICATIONS

J. Am. Chem. Soc. (1988), vol. 110, pp. 7647–7651, "Solid State $^{13}$C NMR Characterization of Polyanilines", S. Kaplan, et al.

Synthetic Metals,1 (1987), vol. 18, pp. 291–296, "Electronic Structure of Some Polyanilines", W. R. Salaneck, et al.

Synthetic Metals, (1989), vol. 28, pp. C629–C638, "Polyaniline: Structural Analysis and Application for Battery", T. Nakajima, et al.

Primary Examiner—Donald L. Walton
Attorney, Agent, or Firm—Oblon, Spivak, McClelland, Maier & Neustadt

[57] ABSTRACT

A polyaniline is highly conductive and less corrosive when it contains up to 7 mol % of benzenoid-ammonium salt state and up to 25 mol % of quinoid-diimine state, based on the total molar amount of the polyaniline.

4 Claims, 9 Drawing Sheets

WAVE LENGTH

BINDING ENERGY (eV)

WAVE LENGTH

POLYANILINE

This invention is a continuation-in-part of the copending application Ser. No. 07/169,881 filed on Mar. 18, 1988.

BACKGROUND OF THE INVENTION

1. Field of the Invention

This invention relates to polyanilines, and more particularly, to polyanilines useful as electrode material, electroconductive material, and circuit element-forming material.

2. Discussion of the Prior Art

Polyaniline has been of great interest as organic electroconductive material and a number of proposals have been made for its application to a variety of fields including batteries, sensors and electrochromic displays. The polyaniline is generally formed by oxidative polymerization of aniline. For application as electronic material, it is desired to form polyaniline from an acidic aqueous solution of aniline by electrolytic or catalytic oxidative polymerization. For oxidative polymerization of aniline, a process of preparing polyaniline by electrolytic oxidation from an acidic aqueous solution of aniline in such an acid as hydrochloric acid, borofluoric acid, sulfuric acid and perchloric acid is known as well as a process of preparing polyaniline by oxidative polymerization from a similar acidic aqueous solution in the presence of such an oxidizing agent as ammonium persulfate, ferric chloride, potassium bichromate, and potassium permanganate.

In order that polyaniline be useful as electronic material, it is particularly important that polyaniline be highly conductive. The polyanilines prepared by the above-mentioned processes are more conductive than those polyanilines prepared from neutral and alkaline solutions, but they are in fact less conductive as compared with conductive inorganic materials such as metals. It is desired to further improve the conductivity of polyaniline.

In order that polyaniline be useful as electronic material, it is also important that the polyaniline bring about no chemical change such as corrosion on an associated material. The polyanilines prepared by the above-mentioned processes cause corrosion of metal materials used therewith because they contain a residue of the acid used in the polymerization step as ammonium salt form. It is proposed to neutralize such polyaniline by treating with an alkali such as ammonia and sodium hydroxide. However, the alkali treatment undesirably reduces conductivity.

In order that polyaniline be useful as electronic material, it is desired to further improve the durability and other properties of polyaniline as electronic material. Particularly when polyaniline is used as electrode material for electrochemical cell, a further improvement in durability and discharge capacity is desired.

SUMMARY OF THE INVENTION

An object of the present invention is to provide a less corrosive, highly conductive polyaniline.

Another object of the present invention is to provide a polyaniline which is improved in self-discharge, life, and discharge capacity when used as an electrochemical cell electrode.

A further object of the present invention is to provide a polyaniline which has a long life when used in sensors and circuit elements.

According to the present invention, there is provided a polyaniline in which up to 7 mol % is present in benzenoid-ammonium salt state and up to 25 mol % is present in quinoid-diamine state, based on the total molar amount of the polyaniline.

BRIEF DESCRIPTION OF THE DRAWING

The above and other objects, features, and advantages of the present invention will be more fully understood from the following description taken in conjunction with the accompanying drawings, in which.

DETAILED DESCRIPTION OF THE INVENTION

Figure 1:
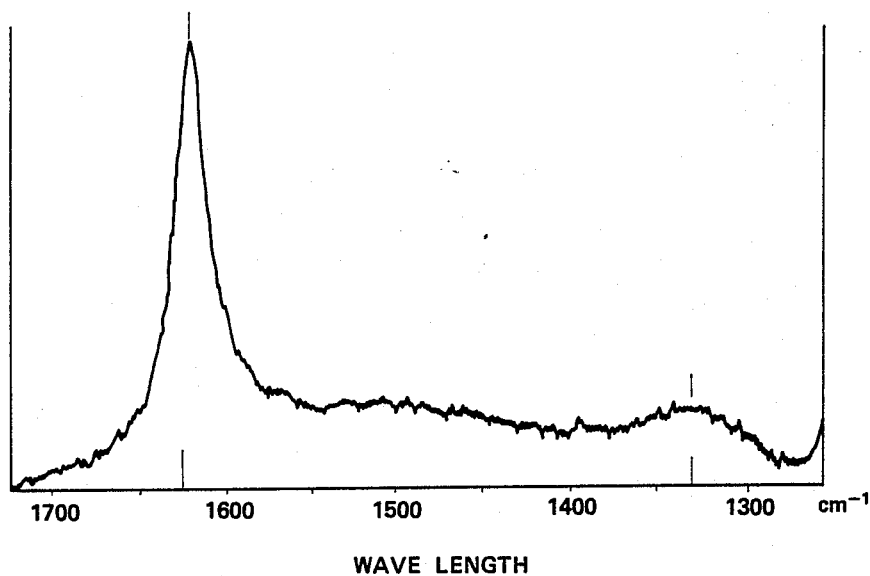
FIG. 1 is a diagram showing the Raman scattering spectrum of the polyaniline of Example 1 in a discharging state, the Raman scattering using exciting laser light at 514.5 nm.

As a result of our research work, we have found that polyaniline is a mixture of four species represented by the following formulae (A) through (D):

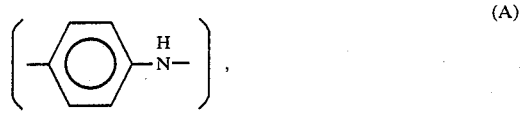

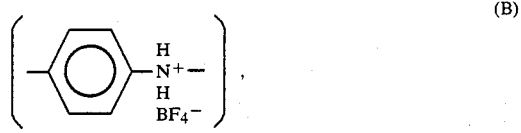

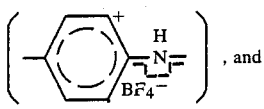 (C) , and

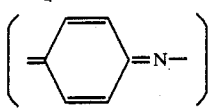 (D) , that is, a mixture of a benzenoid-amine state (formula A), a benzenoid-ammonium salt state (formula B), a dope-semiquinone radical state (formula C), and a quinoid-diimine state (formula D). It is assumed that the anion species is $BF_4$ in formulae (B) and (C). According to the previously prevailing belief, polyaniline shows electrochemical behavior between the benzenoid-amine state (formula A) or benzenoid-ammonium salt state (formula B) and the quinoid-diimine state (formula D). See, for example, A. G. MacDiarmid et al., Synthetic Metals, 13, 291–297 (1986). As opposed to the previous belief, we have discovered that polyaniline shows electrochemical or charging/discharging behavior between the benzenoid-amine state (formula A) or benzenoid-ammonium salt state (formula B) and the dope-semiquinone radical state (formula C), and that the less the quinoid-diimine state (formula D), the more the discharge capacity is.

As to conduction mechanism, we have discovered that semiquinone radical cations as represented by formula C contribute to the conductivity of polyaniline rather than the doping of quinoid-diimine of formula D in which bond alternation occurs.

We have discovered that it is essentially important for the conduction mechanism of polyaniline that the lone electron pair of an N atom plays an essentially important role for the conductivity of polyaniline in that when polyaniline is oxidized, the lone electron pair is converted into unpaired electrons which are unlocalized with the $\pi$-electron system of the phenyl group. To obtain a highly conductive polyaniline, it is preferred that the polyaniline in a doped state be kept in the dope-semiquinone radical state rather than in the quinoid-diimine state.

It was believed that a polyaniline species in the benzenoid-ammonium salt state (formula B) is more conductive and thus more preferred as cell electrode material than that in the benzenoid-amine state (formula A). See, for example, N. Oyama, J. Electroanal. Chem., 161, 399–405 (1984). As opposed to the previous belief, we have discovered that the benzenoid-amine state and the benzenoid-ammonium salt state are approximately equal to each other with respect to conductivity. It cannot be said that either of these states is superior to the other. When polyaniline is used as cell electrode material, particularly when it is used as a positive electrode of a non-aqueous electrolyte lithium secondary cell, a polyaniline composition having a lower content of benzenoid-ammonium salt state is more excellent in self-discharge and float properties. When polyaniline is used as sensor or circuit element-forming material, particularly in a non-aqueous system (see, for example, E. W. Paul, A. J. Ricco, and M. S. Wrighton, J. Phys. Chem., 89, 1441 (1985)), a polyaniline composition having a lower content of benzenoid-ammonium salt state is more excellent because of minimized malfunction. For these applications, a polyaniline composition having a lower content of benzenoid-ammonium salt state exhibits superior performance. In addition, we have discovered that the benzenoid-ammonium salt state is more corrosive.

Based on the above-mentioned discoveries, we have studied the composition of polyaniline which exhibits excellent properties as electronic material. We have found that the above-mentioned objects can be achieved by a polyaniline containing up to:7 mol % of benzenoid-ammonium salt state and up to 25 mol % of quinoid-diimine state.

The polyaniline composition of the present invention contains up to 7 mol % (inclusive) of benzenoid-ammonium salt state and up to 25 mol % (inclusive) of quinoid-diimine state, the mol percent being the proportion of benzenoid-ammonium salt and quinoid-diimine states based on the total molar amount of polyaniline. Preferably, the polyaniline composition of the present invention contains 0 to about 3 mol % of benzenoid-ammonium salt state and 0 to about 18 mol % of quinoid-diimine state. The polyaniline composition of the present invention preferably contains about 18 to 100 mol %, more preferably about 34 to 100 mol % of benzenoid-amine state and 0 to about 50 mol %, more preferably 0 to about 45 mol % of dope-semiquinone radical state.

Since the contents of benzenoid-ammonium salt and quinoid-diimine states are as low as 7 mol % and 25 mol % or less, respectively, the polyaniline composition of the present invention is less corrosive and more conductive. More particularly, the present polyaniline is advantageous in self-discharge, life, and discharge capacity when used as cell electrode material, and last much longer when used as circuit element-forming material.

In contrast, conventional polyaniline contains 0 to 25 mol % of benzenoid-ammonium salt state and 0 to 55 mol % of quinoid-diimine state.. However, in fact, there is available no polyaniline composition containing up to 7 mol % of benzenoid-ammonium salt state and up to 25 mol % of quinoid-diimine state at the same time. The conventional polyaniline composition containing more than 7 mol % of benzenoid-ammonium salt state and/or more than 25 mol % of quinoid-diimine state are less desirable as electronic material.

The polyaniline obtained by the method of Oyama et al. (see J. Electroanal. Chem., 161, 399 (1984)) contains about 55 mol % of quinoid-diimine state although the content of benzenoid-ammonium salt state is approximately equal to 0 mol %. The polyaniline obtained by the method of MacDiarmid et al. contains about 25 mol % and about 30–40 mol % of benzenoid-ammonium salt state in Examples 1 and 3 of Japanese Patent Application Kokai No. 62-71169. This results from a misunderstanding of MacDiarmid et al. that polyaniline changes its state between amine and imine and between benzenoid and quinoid. The double bond between imine and quinone as described in claims 4, 5, 9 and 11 of the laid-open publication does not contribute to the charging/discharging of a cell. This is proven by the fact that a specimen having the only peak at approximately 1470 cm$^{-1}$, but no peak at approximately 1320 cm$^{-1}$ in Raman spectroscopy cannot discharge in non-aqueous electrolyte.

The polyaniline of the present invention may preferably be identified by X-ray photoelectron spectroscopy and electrochemical analysis in combination.

More particularly, in X-ray photoelectron spectroscopy, $C_{1s}$ orbit is calibrated to 284.0 eV, and the peak of the $N_{1s}$ orbit of a polyaniline sample is divided on the basis of Gaussian distribution. The peak is generally divided into three peaks, among which the area of the peak centering at 398.2–398.8 eV represents the sum of benzenoid-amine and quinoid-diimine states, the area of the peak centering at 398.9–400.5 eV represents the dope-semiquinone radical state, and the area of the peak centering at 401.0 eV or higher represents the benzenoid-ammonium salt state. If any one of these states is absent, no peak corresponding thereto appears. Since the quinoid-diimine state appears in the same peak as the benzenoid-amine state, the amount of the quinoid-diimine state is calculated from an electrochemical analysis. To this end, an electrochemical cell is constructed using a polyaniline sample as the working electrode, lithium as the counter electrode, and a propylene carbonate solution containing 1 mol/liter of $LiBF_4$ as the electrolyte. The working electrode is set at a potential of +2 volts vs. the lithium electrode for 100 hours, then at a potential of +3.6 volts for 24 hours, and again at a potential of +2 volts for 24 hours. The discharge capacity of the cell is measured in the second discharge cycle. Then the amount of quinoid-diimine state, y, is given by the following equation:

$$y = (110 - x)/1.1 \text{ mol }\%$$

wherein x is the discharge capacity in Ah per kg of polyaniline. Therefore, the amount of benzenoid-ammonium salt is determined by the analysis of $N_{1s}$ by X-ray photoelectron spectroscopy, the amount of quinoid-diimine state is calculated from the discharge capacity measured in the second discharge cycle, and the amounts of benzenoid-amine and dope-semiquinone radical states are determinable therefrom.

Raman spectroscopy may be used as analysis means auxiliary to the above-mentioned methods. Raman spectroscopy may be carried out by measuring the resonance Raman effect by excitation at 514.5 nm of a polyaniline sample being discharged at +2 volts and charged at +3.6 volts vs. lithium electrode, proving that the quinoid-diimine state is substantially absent.

More particularly, in a discharging state in which polyaniline is not doped with anions at a potential of up to +2 volts vs. lithium electrode, polyaniline is excited with laser light at 514.5 nm and the resulting Raman scattering light is determined. The spectrum may be analyzed based on the fact that a polyaniline species in benzenoid-amine state has a scattering peak in the range of from 1590 $cm^{-1}$ to 1640 $cm^{-1}$ and a polyaniline species in quinoid-diimine state has a scattering peak in the range of from 1450 $cm^{-1}$ to 1520 $cm^{-1}$.

A polyaniline species in dope-semiquinone radical state may be identified as having a scattering peak in the range of from 1300 $cm^{-1}$ to 1350 $cm^{-1}$ in Raman scattering analysis when excited with laser light at 514.5 nm during charging in which the polyaniline is doped with anions at a potential of at least +2.5 volts, especially +3.6 volts vs. lithium electrode.

Explanation is now made how polyaniline converts from dope-semiquinone radical state to quinoid-diimine state during charging. Upon conversion from semiquinone radical to quinone, polyaniline releases a positive charge and a hydrogen ion from the backbone as illustrated by the following formula (E):

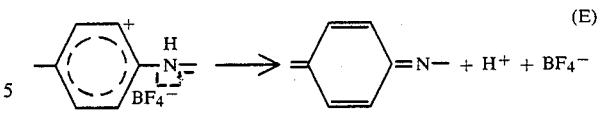

wherein the anion species illustrated is $BF_4^-$. This change can be recognized during measurement of Raman scattering light by exciting polyaniline with laser light at 514.5 nm, because the scattering peak in the range of from 1300 $cm^{-1}$ to 1350 $cm^{-1}$ decreases with a reduction of dope-semiquinone radical state and disappears when all units have converted to quinone-diimine state. If Raman scattering light of polyaniline in a charging state is analyzed to find scattering light in the range of from 1300 $cm^{-1}$ to 1350 $cm^{-1}$ upon excitement at 514.5 nm, then dope-semiquinone radical state is identified. No Raman scattering occurs in the range of from 1300 cm to 1350 $cm^{-1}$ if polyaniline is charged in quinoid-diimine state.

It is to be noted that the amount of benzenoid-ammonium salt state may be determined from the $N_{1s}$ analysis of the above-mentioned X-ray photoelectron spectroscopy or elemental analysis.

When the polyaniline used as electrode material for secondary cells is one predominantly containing a polyaniline species in benzenoid-amine state having a scattering peak in the range of from 1590 $cm^{-1}$ to 1640 $cm^{-1}$ in Raman scattering light analysis with an exciting laser light at 514.5 nm in a discharging state and substantially free of a polyaniline species in quinoid-diimine state having a scattering peak in the range of from 1450 $cm^{-1}$ to 1520 $cm^{-1}$, or one in dope-semiquinone radical state having a scattering peak in the range of from 1300 $cm^{-1}$ to 1350 $cm^{-1}$ in Raman scattering light analysis with an exciting laser light at 514.5 nm in a charging state, there is obtained a secondary or rechargeable cell having a drastically increased discharge capacity because this polyaniline material is confirmed to be substantially free of a polyaniline species in quinoid-diimine state.

As previously described, dope-semiquinone state largely contributes to the conductivity of polyaniline while benzenoid-ammonium salt state and quinoid-diimine state are undesirable with respect to corrosion and conduction. If polyaniline does not generate quinoid-diimine state when doped, then this polyaniline is in dope-semiquinone radical state. This is confirmed by the fact that in the analysis of valence band by X-ray photoelectron spectroscopy, the intensity of a peak appearing at 7–9 eV is higher than that of a peak appearing at 15–20 eV. It is to be noted that in the analysis of valence band by X-ray photoelectron spectroscopy, a polyaniline species in quinoid-diimine state has an electron density peak at an energy region of up to 5 eV, a polyaniline species in dope-semiquinone radical state has an electron density peak at 7–9 eV, and polyaniline species in benzenoid-ammonium salt states have an electron density peak at 15–20 eV. Whether a polyaniline is in dope-semiquinone radical state is also confirmed by $^{13}C$ solid state high-resolution NMR analysis with a contact time of 1 msec. and a relaxation time of 0, by determining that a peak appears in the range of from 140 to 145 ppm and another peak having an intensity of more than 85% of that of the peak does not appear in the range of less than 140 ppm.

A polyaniline composition predominantly containing a polyaniline species in dope-semiquinone radical state exhibiting a higher maximum electron density in the range of 7–9 eV than in the range of 15–20 eV in X-ray photoelectron spectroscopy analysis, or a polyaniline species substantially in dope-semiquinone radical state exhibiting a peak in the range of 140–145 ppm and no peak having an intensity of more than 85% of that of the peak in the range of less than 140 ppm in $^{13}$C solid state high-resolution NMR analysis with a contact time of 1 msec. and a relaxation time of 20 $\mu$sec is particularly useful as conductive material.

When polyaniline is used as sensor or circuit element-forming material, the benzenoid-ammonium salt state is undesirable because it tends to malfunction upon switching as previously described. This type of element carries out switching by utilizing the fact that the conductivity of polyaniline is increased by doping it with an anion. A polyaniline containing quinoid-diimine state has a higher resistance than a polyaniline in benzenoid-amine state and is thus inferior in switching performance. A polyaniline which predominantly contains benzenoid-amine state and is capable of switching through conversion thereof to dope-semiquinone radical is preferred as sensor or circuit element-forming material. The polyaniline composition which does not produce a species in quinoid-diimine state when de-doped, and which predominantly contains a species in benzenoid-amine state is confirmed by $^{13}$C solid state high-resolution NMR analysis with a contact time of 1 msec. and a relaxation time of 20 $\mu$sec, by determining that two peaks appear in the ranges of 115–120 ppm and 135–140 ppm and another peak having an intensity of more than 10% of that of the higher one of the two peaks does not appear in the range of 140–180 ppm. The same is also confirmed by a combination of the above-mentioned methods, particularly by the facts that a main peak appears in the range of 398.2–398.8 eV in the analysis of $N_{ls}$ by X-ray photoelectron spectroscopy, and that a peak appears in the range of 1590–1640 cm and no peak appears in the range of 1500–1200 cm in the Raman scattering analysis with exciting laser light at 514.5 nm, or the facts that no electrolyte is detected by elemental analysis and that no peak appears in the range of 1500–1200 cm$^{-1}$ in the Raman scattering analysis with exciting laser light at 514.5 nm.

Therefore, a polyaniline composition predominantly containing a polyaniline species in benzenoid-amine state exhibiting two peaks in the range of 115–120 ppm and 135–140 ppm and no peak having an intensity of more than 10% of that of the higher one of the two peaks in the range of 140–180 ppm in $^{13}$C solid state high-resolution NMR analysis with a contact time of 1 msec. and a relaxation time of 20 $\mu$sec and substantially free of polyaniline species in quinoid-diimine and benzenoid-ammonium salt states is preferred as sensor and circuit element-forming material.

The method for preparing a polyaniline containing up to 7 mol % of the benzenoid-ammonium salt state and up to 25 mol % of the quinoid-diimine state according to the present invention is not particularly limited. However it is preferred to carry out oxidative polymerization of aniline in an acidic atmosphere and thereafter, remove a benzenoid-ammonium salt state portion.

Preferred are an electrolytic polymerization method for electrodepositing polyaniline from an aqueous acidic solution containing aniline and a chemical polymerization method for preparing polyaniline through chemical oxidative polymerization in an aqueous acidic solution containing aniline and a catalyst.

The electrolytic polymerization method will be described in detail.

The acid in the aqueous acidic solution used herein is not particularly limited although HCl, $H_2SO_4$, $HBF_4$, $HClO_4$ and a mixture thereof are preferably used. The most preferred acid is $HBF_4$. The concentration of acid is preferably set to 0.1 to 3 mol/liter, more preferably 0.5 to 2.5 mol/liter. Aniline is preferably present in the aqueous acidic solution in a concentration of 0.05 to 4 mol/liter, more preferably 0.25 to 1.5 mol/liter. The aqueous acidic solution may optionally contain another additive such as a soluble salt for pH adjustment in addition to the acid and aniline ingredients.

Working and counter electrodes are immersed in the above-mentioned aqueous acidic solution to prepare polyaniline through electrolytic polymerization. The electrodes used are not particularly limited. The working electrode may be formed of platinum, stainless steel, carbon and $PbO_2$ and have any desired shape including plate, foil, mesh and punched metal form. Mesh stainless steel is most preferred as the working electrode. The counter electrode may also be formed of platinum, stainless steel, carbon and $PbO_2$ and have any desired shape including plate, foil, mesh and punched metal form. A stainless steel plate in punched metal form is most preferred as the counter electrode.

Electrolytic polymerization may be carried out in either a potential or current controlled mode. The current controlled mode of electrolytic polymerization may include a constant current control mode wherein a fixed value of current is continuously applied, a step current control mode wherein the value of current is changed in predetermined time intervals, a continuous current control mode wherein current is increased or decreased with time, and a cyclic current control mode wherein the value of current is changed cyclically. Electrolytic polymerization may be carried out under any desired conditions, often under conventional conditions while the polymerization solution is kept at a temperature of from $-10°$ C. to $15°$ C., preferably from $-5°$ C. to $9°$ C.

Preparation of polyaniline is described in copending U.S. Ser. No. 863,527 assigned to the same assignee as the present invention.

When polyaniline is prepared by chemical polymerization, an aqueous acidic solution having a catalyst added thereto is used as described above. The solution used herein may be the same as previously described for electrolytic polymerization. Any desired catalyst may be added as long as it promotes the reaction. For example, $Na_2S_2O_8$, $(NH_4)_2S_2O_8$, and $FeCl_3$ may be added. Chemical polymerization may be carried out in a conventional manner while the polymerization solution is preferably kept at a temperature of at least $30°$ C.

More particularly, aniline is first oxidatively polymerized in an acidic aqueous solution of aniline in $HBF_4$, HF, HCl, $HClO_4$ or another suitable acid by electrolysis or in the presence of a catalyst. In the polymerization solution immediately after polymerization, the resultant polyaniline composition consists of 20–60 mol % of benzenoid-amine state, 12–25 mol % of benzenoid-ammonium salt state, and 30–55 mol % of dope-semiquinone radical state, and is almost free of quinoid-diimine state if the solution is more acidic than pH 1. The benzenoid-ammonium salt state is then removed from the polyaniline.

It may be contemplated to convert the benzenoid-ammonium salt state to the benzenoid-amine state by an alkali treatment as shown by the following equation (1):

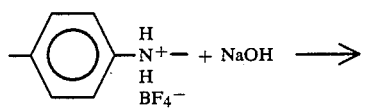
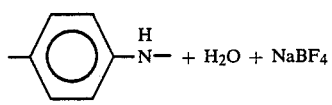
(1)

This method, however, has the risk of reducing capacity because the dope-semiquinone radical unit in the polyaniline converts to a quinoid-diimine unit as the polyaniline releases a proton from its backbone as shown by the following equation (2):

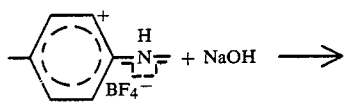
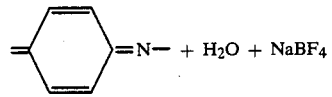
(2)

According to our research, since conversion of dope-semiquinone radical state to quinoid-diimine state proceeds rapidly on a more alkaline side than pH 4.0, even ordinary water washing will result in quinoid-diimine state. Once converted to quinoid-diimine state, the polyaniline can hardly resume the dope-semiquinone radical state even when it is returned to an acidic solution.

More specifically, a polyaniline composition which is polymerized from an acid solution consists essentially of benzenoid-amine, benzenoid-ammonium salt, and dope-semiquinone radical states in admixture. When this polyaniline composition is washed with water, the benzenoid-ammonium salt state is converted to a benzenoid-amine unit at a certain rate and the dope-semiquinone radical unit is converted to a quinoid-diimine unit at a somewhat slower rate. The washed polyaniline thus has a minimal content of dope-semiquinone radical state. In fact, an analysis of valence band by X-ray photoelectron spectroscopy reveals a peak at 7-9 eV attributable to the dope-semiquinone radical state, but a peak appearing at 15-20 eV attributable to the benzenoid-ammonium salt states has a higher intensity. See P. Snauwaert et al., Synthe. Met., 18, 335-340 (1987). A $^{13}$C solid state high-resolution NMR analysis reveals a peak approximately at 130 ppm rather than a peak at 140-145 ppm attributable to the dope-semiquinone radical state. See, for example, T. Hjertberg et al., J. Pol. Sci. Pol. Let., 23, 503-508 (1985).

An alkali or acid treatment cannot increase the amount of dope-semiquinone radical state remarkably. Upon measurement of valence band in an X-ray photoelectron spectrum, no peak at 7-9 eV attributable to the dope-semiquinone radical state is observed for the alkali treated polyaniline, and the peak at 15-20 eV is higher than the peak at 7-9 eV for the acid treated polyaniline. See, for example, W. R. Salaneck et al., Synthe. Met., 18, 291-296 (1987). A $^{13}$C solid state high resolution NMR analysis reveals a peak at 120-130 ppm in addition to a peak at 140-145 ppm attributable to the dope-semiquinone radical state for the alkali treated polyaniline, but only a peak approximately at 130 ppm for the acid treated polyaniline.

Therefore, the preferred method for obtaining a polyaniline containing up to 7 mol % of benzenoid ammonium salt state and up to 25 mol % of quinoid-diimine state from a polymerized polyaniline by eliminating a benzenoid-ammonium salt state therefrom without generating quinoid-diimine state is either of the following methods or a combination thereof.

A first method includes dipping the as-polymerized polyaniline in an acidic aqueous solution of a hydrazine such as hydrazine hydrochloride and hydrazine tetrafluoroborate, and then treating the polyaniline with hydrazine. The treating conditions are not particularly limited. Preferably, the acidic treatment uses an acidic aqueous solution containing about 50 mmol/liter to about 2 mol/liter of hydrazine in an amount of at least 50 ml per 100 mg of the polyaniline. When an acidic treatment with hydrazine tetrafluoroborate is desired, a mixture of aqueous solutions of borofluoric acid and hydrazine may be used. The mixing proportion is not limited as long as the mixture is more acidic than pH 3. For example, an aqueous solution containing 100 mmol/liter to 4 mol/liter of borofluoric acid and an aqueous solution containing 50 mmol/liter to 2 mol/liter of hydrazine may be suitably blended. One standard treating solution is an aqueous solution of 1M $N_2H_4 \cdot 2HBF_4$ at pH 1 which is obtained by mixing 286.5 ml of 42% borofluoric acid, 48.5 ml of hydrazine monohydrate, and 665.0 ml of distilled water. The polyaniline is dipped in such acidic solution at a temperature of from $-5°$ C. to 30° C. for about 3 to about 24 hours.

The subsequent hydrazine treatment is carried out by exposing the polyaniline in thin film form to hydrazine vapor or dipping the polyaniline in thick film form in an aqueous hydrazine solution. The time of exposure to hydrazine vapor preferably ranges from about 5 minutes to 72 hours, more preferably about 5 minutes to 3 hours. In the latter case, a polyaniline thick film is dipped in an aqueous solution containing about 10 weight/volume % to about 50 weight/volume % of hydrazine at a temperature of from $-5°$ C. to 30° C. for about 12 to about 48 hours. It is undesirable to treat as-polymerized polyaniline with hydrazine without the acidic hydrazine treatment. Since hydrazine is alkaline, the polyaniline is converted into quinoid-diimine state by directly treating it with hydrazine. It is rather easy to discriminate the benzenoid-amine state and the quinoid-diimine state from each other because a polyaniline in the benzenoid-amine state is colorless (a thin film is transparent and a thick film is white) and a polyaniline having the quinoid-diimine state produced is blue and grey when further deteriorated.

For the above mentioned treatments, it is important to remove hydrazine after the treatment. It is important not to expose the polyaniline to an oxidizing atmosphere during hydrazine removal. A polyaniline species in benzenoid-amine state will be oxidized with oxygen in air if it is exposed to air for a long period of time. It is thus preferred to wash the treated polyaniline with a solvent which is deaerated in vacuum or purged with inert gas, such as methanol, ethanol, acetonitrile, and water. The polyaniline may be dried in any desired manner. The polyaniline is preferably dried without raising the drying temperature beyond 100° C., and most preferably dried in vacuum at a temperature of lower than 60° C. Thereafter, the polyaniline is preferably maintained in vacuum or inert gas in a cold dark room although it may be stored in an ordinary room which is shielded from sunlight.

The above-mentioned method results in a polyaniline composition predominantly containing a polyaniline species in benzenoid-amine state exhibiting a peak in the range of 115-120 ppm and another peak in the range of 135-140 ppm and no peak having an intensity of more than 10% of that of the higher one of the two peaks in the range of 140-180 ppm in $^{13}$C solid state high-resolution NMR analysis with a contact time of 1 msec. and a relaxation time of 20 μsec.

More specifically, the marker bands of polyaniline species in dope-semiquinone radical, benzenoid-ammonium salt, benzenoid-amine and quinoid-diimine states are measured in $^{13}$C solid state high-resolution NMR analysis. When they are calibrated with the reference of the carbonyl of glycine set at 176.5 ppm, the dope-semiquinone radical state gives a single peak at about 130 ppm (see, for example, F. Devreux et al., J. Physique, 46 (1985)), and the benzenoid-ammonium salt state gives a single peak at about 130 ppm. The benzenoid-amine state gives a peak at 115-120 ppm and another peak at 135-140 ppm. The quinone-diimine state gives a peak at 140-180 ppm attributable to quinone-diimine in addition to two peaks at 115-120 ppm and 135-140 ppm as observed in the benzenoid-amine state. It is then possible to obtain a polyaniline composition consisting essentially of benzenoid-amine state by controlling polyaniline such that it exhibits two peaks in the range of 115-120 ppm and 135-140 ppm and no peak in the range of 140-180 ppm in $^{13}$C solid state high-resolution NMR analysis with a contact time of 1 msec. and a relaxation time of 0. It is preferred that no peak appears at 140-180 ppm. A peak may appear at 140-180 ppm as long as it has an intensity of less than 10% of that of the higher one of the two peaks in the ranges of 115-120 ppm and 135-140 ppm because a reduction of conductivity by a polyaniline species in quinoid-diimine state is negligible with such a low content.

A second method includes treating the as-polymerized polyaniline in a non-aqueous electrolyte solution (free of ether solvent) with a potential of about +3.9 volts vs. lithium electrode applied to the polyaniline, to thereby convert the benzenoid-ammonium salt state to the dope-semiquinone radical state as shown by the following equation (3):

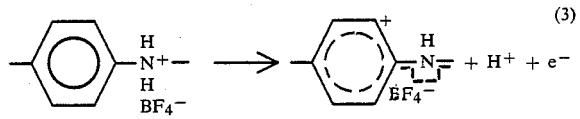

The method of converting benzenoid-ammmonium salt state to dope semiquinone radical state by electrolysis is not particularly limited. It is preferred to immerse the polyaniline in an organic medium containing 0.5 to 3 mol/liter of a lithium salt such as lithium borofluoride, lithium perchlorate, $LiAsF_6$, $LiSbF_6$ and $LiPF_6$, typically, a well-known electrolytic solution for lithium cells (which will be described later), and apply a voltage of 3 to 4 volts vs. the lithium counter electrode to the polyaniline for 1 to 50 hours, preferably 1 to 12 hours. For example, conversion may preferably be carried out by thoroughly drying a solution containing about 0.5 to about 2 mol/liter lithium borofluoride in propylene carbonate, immersing the polyaniline in the electrolytic solution, and applying a voltage of 3.9 volts vs. the lithium counter electrode for about 3 to about 6 hours. The time for which a voltage of 3.9 volts is applied is preferably within 50 hours because a longer time of voltage application will deteriorate the polyaniline. The thus produced polyaniline is preferably stored by maintaining it in thoroughly dried hexane, acetonitrile or electrolytic solution for lithium cells, or in vacuum or inert gas. It is desired to avoid water and alkaline environment releasing a hydroxyl group. The storage environment is limited to prevent the polyaniline in dope-semiquinone radical state from undergoing neutralization reaction similar to equation (2) to convert to quinoid-diimine state.

A polyaniline composition predominantly containing a polyaniline species in dope-semiquinone radical state exhibiting a higher maximum electron density at 7-9 eV than at 15-20 eV in X-ray photoelectron spectroscopy analysis, or a polyaniline composition predominantly containing a polyaniline species substantially in dope-semiquinone radical state exhibiting a peak at 140-145 ppm and no peak having an intensity of more than 85% of that of the peak in the range of less than 140 ppm in $^{13}$C solid state high resolution NMR analysis with a contact time of 1 msec. and a relaxation time of 20 μsec may be controlled with respect to doping conditions by purifying the polyaniline composition, and thereafter constructing an electrochemical cell in a proton acceptor-free electrolytic solution, for example, non-aqueous electrolytic solution to thereby control such that the polyaniline in the doped state (in which polyaniline is doped with anions, with a potential of at least +2.5 volts vs. lithium electrode) may not change from dope-semiquinone radical state to quinoid-diimine state, that is, constructing an electrochemical cell with polyaniline such that upon analysis of Raman scattering light of the polyaniline in doped state, scattering light may appear at 1320 cm$^{-1}$ with excitement at 514.5 nm or an intense electron density peak appear at 7-9 eV in X-ray photoelectron spectroscopy, or constructing an electrochemical cell with polyaniline such that the peak appearing at 140-145 ppm in $^{13}$C solid state high-resolution NMR analysis may not decrease. Important control factors are the composition of electrochemical cell-forming electrolytic solution, degree of purification of polyaniline, ambient temperature, doping voltage, and temperature rise upon doping. More specifically, the preferred electrolytic solution is a well-known electrolytic solution for lithium cells, such as propylene carbonate and ethylene carbonate. When an ether such as dimethoxy ethane is added to the solution to reduce its viscosity, the doping voltage is preferably lowered by about 0.1 volts. Since a rise of the ambient temperature and doping temperature promotes conversion of semiquinone radical to quinone, it is preferred to lower the doping voltage. The doping voltage affects the process of conversion of semiquinone radical to quinone to such a substantial extent that conversion to quinone may be terminated by lowering the doping voltage. The degree of purification of polyaniline is also important. If the polyaniline is doped from benzenoid-amine state, it is once converted to dope-semiquinone radical state, but again to quinoid-diimine state through application of a voltage of about +4.3 volts vs. the lithium counter electrode. Since re-conversion may be prevented by lowering the doping voltage to about 3.7 volts when the ambient temperature is approximately 20° C. Preferably the polyaniline is then treated by washing with a solvent having low proton acceptability such as acetonitrile and drying in vacuum.

In order to convert a part of the benzenoid-amine state to dope-semiquinone radical state, a voltage of 2 to 3.9 volts vs. a lithium counter electrode may further be applied to the polyaniline obtained by either of the above-described two method in a non-aqueous electrolytic solution, whereby the conductivity of the polyaniline is controlled. More specifically, the method is preferred to immerse the polyaniline in an ether-free organic medium containing 0.5 to 3 mol/liter of a lithium salt such as lithium borofluoride, lithium perchlorate, $LiAsF_6$, $LiSbF_6$ and $LiPF_6$, typically, a well-known electrolytic solution for lithium cells (which will be described later), and apply a voltage of 2 to 3.9 volts, preferably 2 to 3.6 volts, vs. the lithium counter electrode to the polyaniline for 10 minutes to 72 hours, preferably 1 to 24 hours. For example, conversion may preferably be carried out by thoroughly drying a solution containing about 0.5 to about 2 mol/liter lithium borofluoride in propylene carbonate, immersing the polyaniline in the electrolytic solution, and applying a voltage of 2 to 3.6 volts vs. the lithium counter electrode for about 1 to about 24 hours.

The polyaniline of the present invention may preferably be used as positive electrode material to form an electrochemical cell having improved charging/discharging characteristics and an extended life. A variety of negative electrode active materials may be used in the cell. Preferred negative electrode active material is a material capable of reversibly releasing and receiving a cation to and from an electrolyte. The negative electrode is preferably comprised of an active material capable of capturing a cation therein in a charging or reducing state and releasing the cation therefrom in a discharging or oxidizing conditions. Examples of the negative electrode active material include compounds having a high degree of conjugated bond in their molecule, for example, polynuclear aromatic compounds such as anthracene, naphthalene, and tetracene, conductive organic high-molecular weight compounds, and graphite. Also useful are metals capable of converting to mono- or divalent cations, for example, lithium, sodium, potassium, magnesium, calcium, barium, zinc, and alloys containing such an element.

Among these negative electrode active materials, lithium and lithium alloys are preferred because of high cell voltage, good cycle performance, and low self-discharge. A non-aqueous lithium secondary cell having improved cell performance including cell voltage, capacity density, cycle life, and self-discharge is obtained by combining a negative electrode active material in the form of lithium or lithium alloy with a positive electrode active material in the form of a polyaniline according to the present invention.

Preferred examples of the lithium alloy include Li-Al, Li-Al-In, and Li-Al-Bi although alloys of lithium with any metals capable of alloying with lithium are contemplated herein. For example, alloys of lithium with at leas one member selected from Al, Mg, In, Pb, Sn, Bi, Sb, Ta, Zn, and Cd may be used.

The electrolyte which constitutes an electrochemical cell is a compound having an anion combined with a cation. Some illustrative, non-limiting examples of the anion include anions of Group Va element halides such as $PF_6^-$, $SbF_6^-$, $AsF_6^-$, and $SbCl_6^-$, anions of Group IIIa element halides such as $BF_4^-$ and $AlCl_4^{31}$, halide anions such as $I^-(I_3^-)$, $Br^-$, and $Cl^-$, perchlorate anions such as $ClO_4^-$, and $HF_2^-$, $CF_3SO_3^-$, $SCN^-$, $SO_4^{--}$, $HSO_4^-$, etc. Some illustrative, non-limiting examples of the cation include alkali metal ions such as $Li^+$, $Na^+$, and $K^+$ and alkaline earth metal ions such as $Mg^{2+}$, $Ca^{2+}$, and $Ba^{2+}$ as well as $Al^{3+}$ and quaternary ammonium ions such as $R_4N^+$ wherein R is hydrogen or a hydrocarbon residue. Illustrative examples of compounds having such anions and cations include $LiPF_6$, $LiSbF_6$, $LiAsF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $KSCN$, $LiSO_3CF_3$, $(n-C_4H_7)_4NAsF_6$, $(n-C_4H_7)_4NPF_6$, $(n-C_4H_7)_4NClO_4$, $(n-C_4NBF_4$, $(C_2H_5)_4NClO_4$, and $(n-C_4H_7)_4NI$. Lithium salts, particularly $LiClO_4$ and $LiBF_4$ are preferred among others.

The electrolytes are generally used as solutions thereof dissolved in solvents. The type of solvent is not particularly limited although preferred are relatively highly polar non-aqueous solvents. Examples of the solvents include ethylene carbonate, propylene carbonate, benzonitrile, acetonitrile, tetrahydrofuran, 2-methyltetrahydrofuran, gamma-butyrolactone, triethyl phosphate, triethyl phosphite, dimethyl sulfate, dimethylformamide, dimethylacetamide, dimethylsulfoxide, dioxane, dimethoxyethane, polyethylene glycol, sulfolane, dichloroethane, chlorobenzene, and nitrobenzene alone or mixtures of two or more of them.

The electrolyte used in the cell further includes organic solid electrolytes which are obtained by impregnating such polymers as polyethylene oxide, polypropylene oxide, isocyanate-crosslinked polyethylene oxide, and phosphazine polymer having an ethylene oxide oligomer side chain with the above-mentioned electrolyte compounds; and inorganic solid electrolytes, for example, inorganic ion conductors such as $Li_3N$ and $LiBCl_4$ and lithium glass species such as $Li_4SiO_4$ and $Li_3BO_3$.

The cells or batteries are usually constructed by placing the positive and negative electrodes in an outer casing while interposing the electrolyte liquid between the electrodes. If desired, a porous film formed of a synthetic resin such as polyethylene and polypropylene or natural fibers may be disposed between the positive and negative electrodes as a separator.

The environment surrounding polyaniline from its polymerization to its assembly into an electrochemical cell or battery may be established by filling the surrounding atmosphere with an inert gas such as argon gas, using a non-oxidizing atmosphere of hydrazine vapor, precisely controlling the time period between polymerization and assembly, or maintaining the wash liquid for polyaniline weakly acidic or acidic. The composition of electrolytic solution of the cell may be regulated by controlling the concentration of water or the concentration of a proton acceptor such as hydroxyl group.

The polyaniline of the present invention will find an application in other conventional known uses. For such applications, the polyaniline may be used in an ordinary manner.

Since a polyaniline composition is provided by the present invention in which the content of benzenoid-ammonium salt state is up to 7 mol % and the content of quinoid-diimine state is up to 25 mol %, it has excellent characteristics as electronic material and is less corrosive and highly conductive. It exhibits improved self-discharge at elevated temperatures, floating, discharge capacity, and durability when used as electrode material for electrochemical cells. It lasts for an extended time when used in sensors and circuit elements. The polyaniline of the present invention is thus advantageous for use as electrode material, conductive material and circuit element-forming material in electrochemical cells, sensors, electrochromic displays, and photo-cells.

EXAMPLES

Examples of the present invention are given below by way of illustration and not by way of limitation.

EXAMPLE 1

A polyaniline was prepared by forming an electrolytic solution containing 5 ml of aniline and 15 ml of 42% borofluoric acid in 30 ml of deionized water, setting a polymerization electrode of platinum and a counter electrode of platinum in the solution, and conducting a constant current of 10 milliamperes (mA) across the electrodes for 2.8 hours.

The as-polymerized polyaniline was dipped in an aqueous solution containing 1 mol/liter of hydrazine hydrochloride at pH about 1 at room temperature for 24 hours, again dipped in an aqueous solution containing 30 weight/volume% of hydrazine at room temperature for 24 hours, washed with methanol, and then dried in vacuum.

A battery was constructed using the polyaniline as the positive electrode, lithium as the negative electrode, and an electrolyte liquid containing 1 mol of LiBF4 per liter of propylene carbonate. The battery was charged with a constant current of 0.1 mA until the polyaniline electrode reached 3.6 volts (V) vs. the lithium electrode, and then discharged with a constant current of 0.1 mA until the polyaniline electrode reached 1.7 V vs. the lithium electrode.

The polyaniline was examined for composition by Raman scattering analysis with exciting laser light at 514.5 nm to give the spectrum of FIG. 1, which shows that it predominantly contained a polyaniline species in benzenoid-amine state having a scattering peak in the range of 1590 to 1640 cm$^{-1}$ and was substantially free of a polyaniline species in quinoid-diimine state having a scattering peak in the range of 1450 to 1520 cm$^{-1}$.

Figure 2:
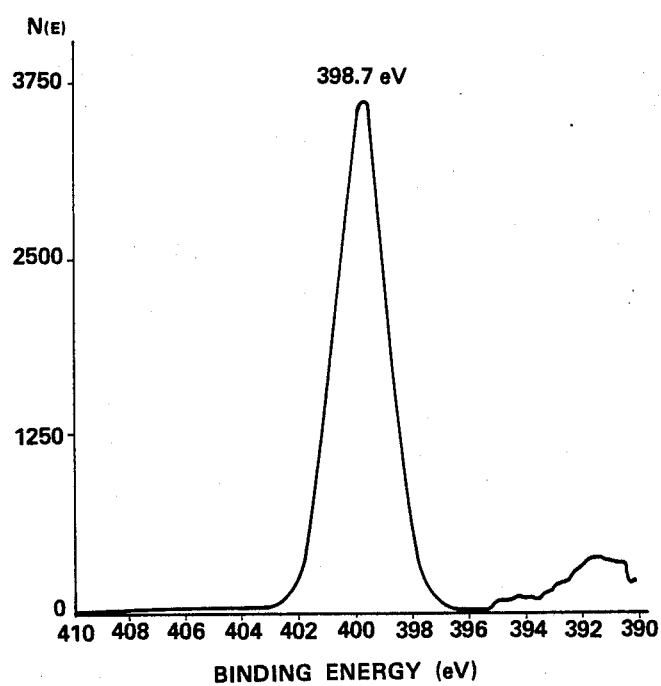
FIG. 2 is a diagram showing the $N_{ls}$ spectrum of the polyaniline of Example 1 by X-ray photoelectron spectroscopy (calibrated to $C_{ls}=284.0$ eV)

The $N_{ls}$ spectrum of the polyaniline determined by X-ray photoelectron spectroscopy is shown in FIG. 2, which shows that it was completely free of dope-semiquinone radical and benzenoid-ammonium salt states and consisted of substantially 100% benzenoid-amine state. It is to be noted that numerical figures on the abscissa of FIG. 2 do not coincide with numerical figures in FIG. 2 because the latter are calibrated figures. The calibrated figures in FIG. 2 are true values. The same applies to FIG. 3.

The battery was again charged with a constant current of 0.1 mA until the polyaniline electrode reached 3.6 (V) vs. the lithium electrode, and then discharged with a constant current of 0.1 mA until the polyaniline electrode reached 2.0 V vs. the lithium electrode. The discharge capacity density was determined 110 Ah/kg.

The battery was charged until the polyaniline electrode reached 3.6 (V) vs. the lithium electrode and allowed to stand at 60° C. for 10 days. The battery showed a capacity retentivity was 91%.

EXAMPLE 2

A polyaniline was prepared by forming an electrolytic solution containing 5 ml of aniline and 15 ml of 42% borofluoric acid in 30 ml of deionized water, setting a polymerization electrode of platinum and a counter electrode of platinum in the solution, and conducting a constant current of 10 milliamperes (mA) across the electrodes for 2.8 hours.

The as-polymerized polyaniline was washed with distilled water and then dried in vacuum.

An electrochemical cell was constructed using the polyaniline as the positive electrode, lithium as the negative electrode, and 50 ml of an electrolyte liquid containing 1 mol of LiBF4 per liter of propylene carbonate. Electricity was conducted across the electrodes at a constant voltage of 3.9 V for 3 hours and then a constant voltage of 3.8 V for another 3 hours. The polyaniline was washed with deoxygenated acetonitrile and dried in vacuum.

Figure 3:
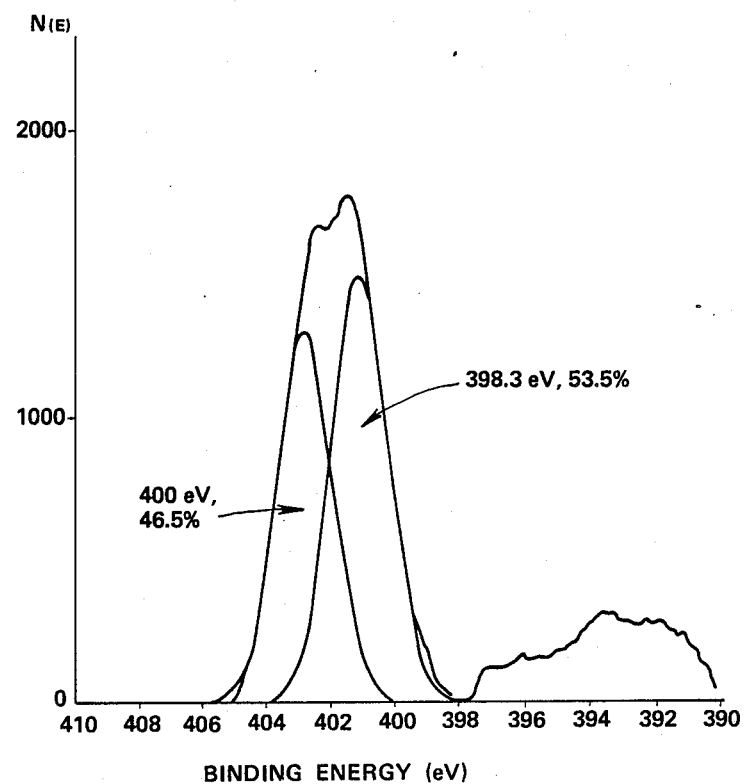
FIG. 3 is a diagram showing the $N_{ls}$ spectrum of the polyaniline of Example 2 by X-ray photoelectron spectroscopy (calibrated to $C_{ls}=284.0$ eV)

FIG. 3 illustrates the spectrum of the polyaniline by X-ray photoelectron spectroscopy $N_{ls}$.

A battery was constructed using the polyaniline as the positive electrode, lithium as the negative electrode, and an electrolyte liquid containing 1 mol of LiBF4 per liter of propylene carbonate. The battery was discharged at a fixed voltage of 2 V for 100 hours, charged at a fixed voltage of 3.6 V for 24 hours, and then discharged at a fixed voltage of 2 V for 24 hours. The discharge capacity measured in the last cycle was 110 Ah/kg.

Based on the above data, the polyaniline was identified as having the following composition:
benzenoid-amine stat 54 mol %
dope-semiquinone radical state 46 mol %
quinoid-diimine state 0 mol %.

The battery was charged until the voltage reached 3.6 V vs. the lithium electrode and allowed to stand for 10 days at 60° C. The battery showed a capacity retentivity was 91%.

COMPARATIVE EXAMPLE 1

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was washed with five portions of distilled water for a total period of 120 hours, each in an amount of 10 ml per mg of polyaniline, and then dried in vacuum.

The polyaniline was subjected to elemental analysis for nitrogen and fluorine elements to find that the combined content of benzenoid-ammonium salt and dope-semiquinone radical states was 10 mol %.

A battery was constructed from the polyaniline. Based on the initial discharge capacity, the content of dope-semiquinone radical state was determined to be 8 mol %. The content of benzenoid-ammonium salt state was then calculated to be 2 mol %. The cell was further charged up to 3.6 V and the discharge capacity was determined to be 76 Ah/kg. It was concluded that there were present 31 mol % of quinoid-diimine state and 59 mol % of benzenoid-amine state.

A battery was constructed from the polyaniline and tested by the same procedure as in Example 1. The discharge capacity was 70 Ah/kg and the capacity retentivity after 10-day standing at 60° C. was 90%.

COMPARATIVE EXAMPLE 2

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was washed with water for 30 minutes in an amount of 10 ml per mg of polyaniline, and then dried in vacuum.

The polyaniline was analyzed as in Comparative Example 1 to find that there were present 42 mol % of benzenoid-amine state, 30 mol % of dope-semiquinone radical state, 17 mol % of benzenoid-ammonium salt state, and 11 mol % of quinoid-diimine state.

A battery was constructed from the polyaniline and tested by the same procedure as in Example 1. The discharge capacity was 105 Ah/kg and the capacity retentivity after 10-day standing at 60° C. was 55%.

EXAMPLE 3

A polyaniline was prepared by forming an electrolytic solution containing 5 ml of aniline and 15 ml of 42% borofluoric acid in 30 ml of deionized water, setting a polymerization electrode of platinum and a counter electrode of platinum in the solution, and conducting a constant current of 10 mA across the electrodes for 2.8 hours.

The as-polymerized polyaniline was dipped in an aqueous solution containing 1 mol/liter of hydrazine hydrochloride at pH about 1 for 24 hours, and again dipped in an aqueous solution containing 30 weight-/volume% of hydrazine for 24 hours, washed with methanol, and then dried in vacuum.

An electrochemical cell was constructed using the polyaniline as the positive electrode, lithium, as the negative electrode, and an electrolyte liquid containing 1 mol of $LiBF_4$ per liter of propylene carbonate. The polyaniline electrode was doped with a constant current of 0.1 mA until it reached 3.8 V vs. the lithium electrode, washed with acetonitrile, and dried in vacuum.

Figure 4:
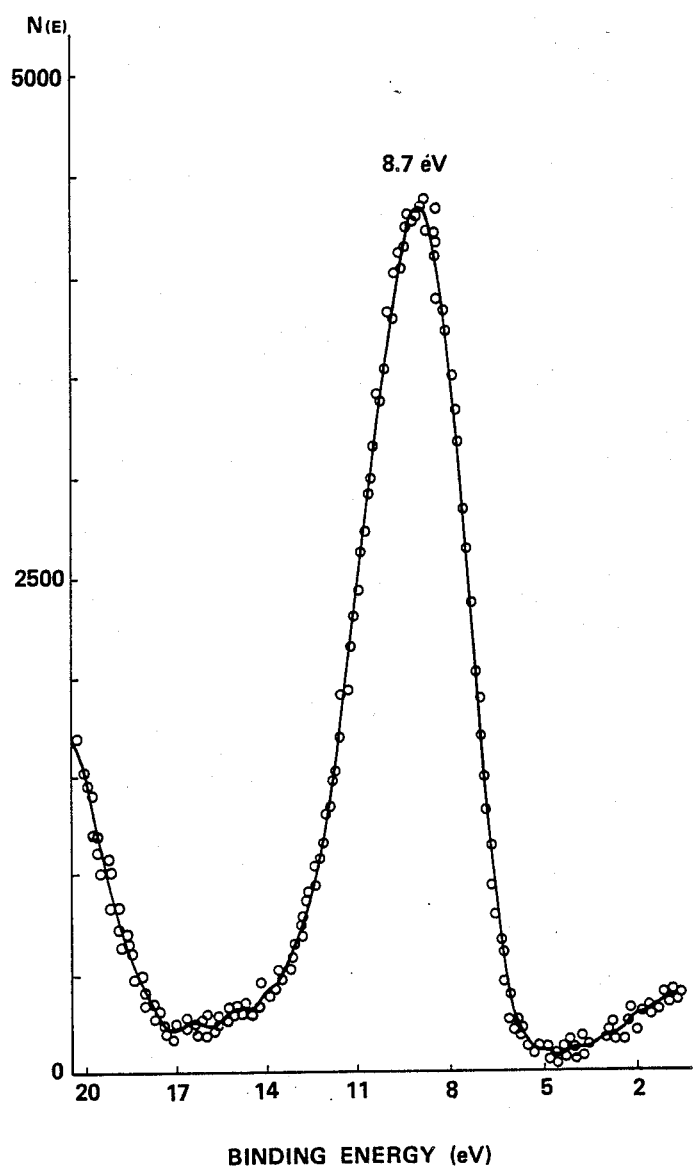
FIG. 4 is a diagram showing the spectrum of the polyaniline of Example 3 by X-ray photoelectron spectroscopy.

The polyaniline was analyzed by X-ray photoelectron spectroscopy to obtain the diagram of FIG. 4. An intense peak appeared at 7-9 eV, which indicated a large content of dope-semiquinone radical state. The conductivity of the polyaniline was determined to be 50 S/cm.

Figure 5:
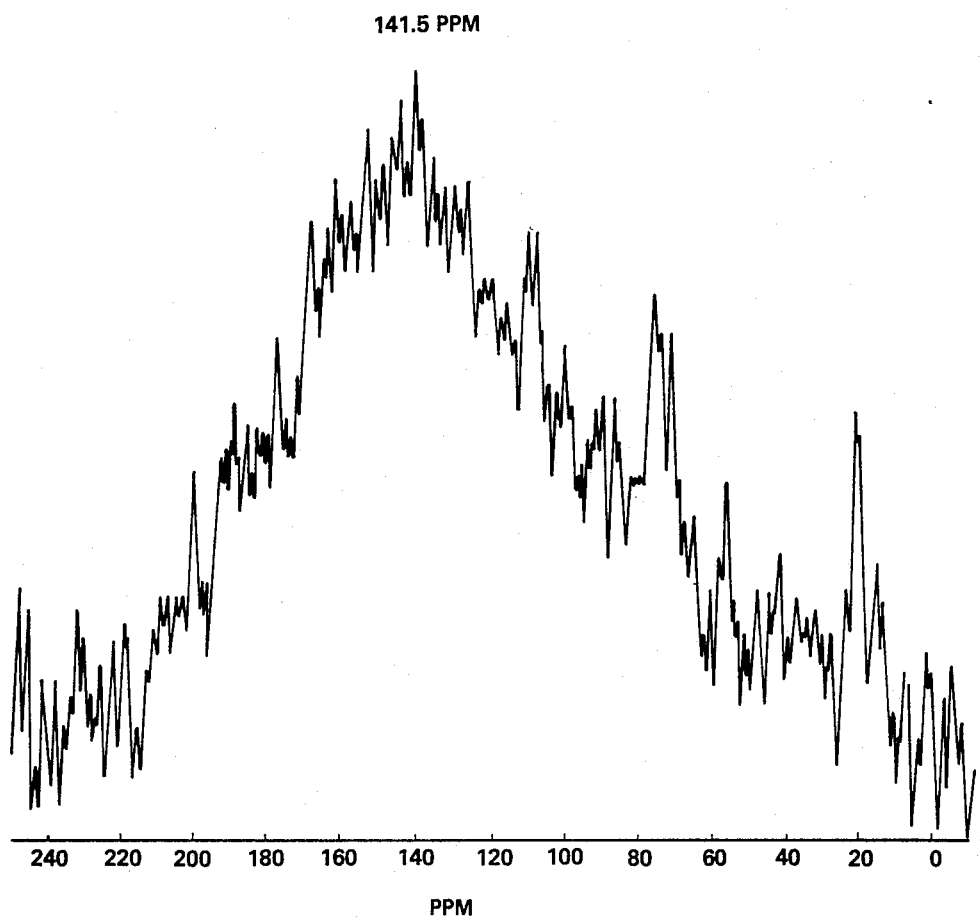
FIG. 5 is a diagram showing the spectrum of the polyaniline of Example 3 by $^{13}C$ solid state high-resolution NMR.

The polyaniline was analyzed by $^{13}C$ solid state high-resolution NMR to obtain the diagram of FIG. 5. It showed a peak at 140-145 ppm, and no peak having an intensity of more than 85% of that of the peak in the range of less than 140 ppm, also indicating that the content of dope-semiquinone radical state is large.

COMPARATIVE EXAMPLE 3

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was dipped in 1M sodium hydroxide for 24 hours, washed with methanol, and then dried in vacuum.

Figure 6:
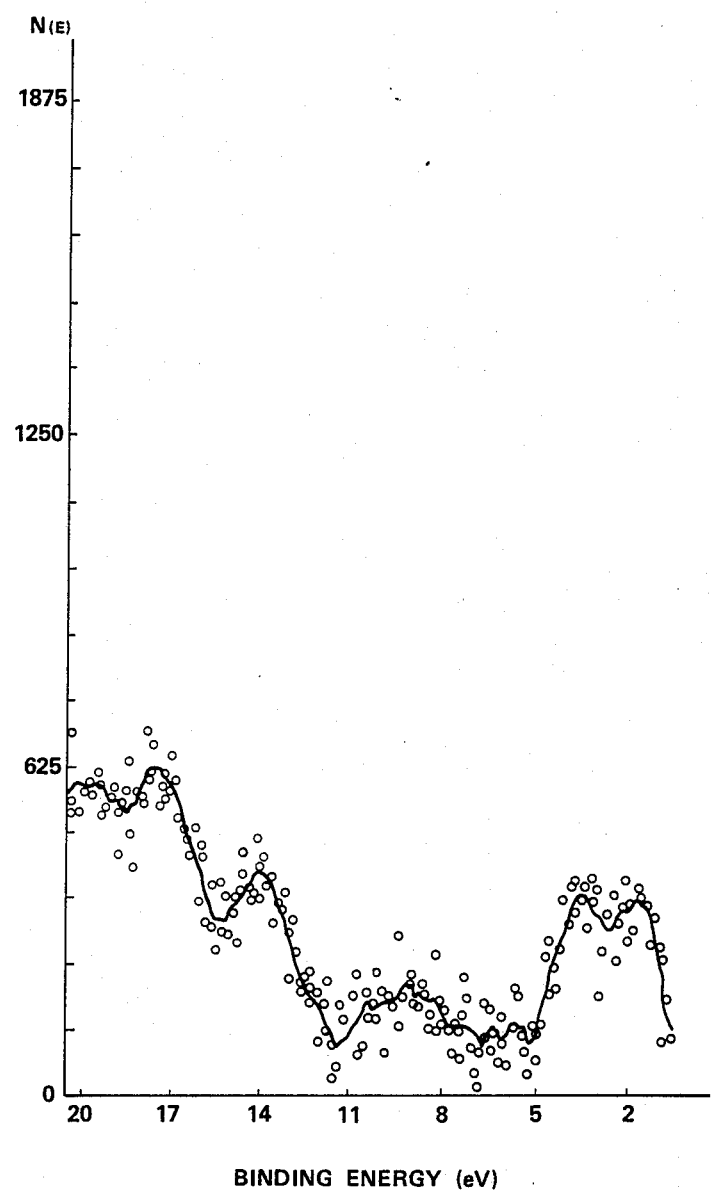
FIG. 6 is a diagram showing the spectrum of the polyaniline of Comparative Example 3 by X-ray photoelectron spectroscopy.

The polyaniline was analyzed by X-ray photoelectron spectroscopy. As seen from the spectrum shown in FIG. 6, two low peaks appeared in an energy region of less than 5 eV, indicating an increased content of quinoid-diimine state. The conductivity of the polyaniline was determined to be less than $10^{-6}$ S/cm A battery was constructed using the polyaniline as the positive electrode, lithium as the negative electrode, and an electrolyte liquid containing 1 mol of $LiBF_4$ per liter of propylene carbonate. The battery was charged with a constant current of 0.1 mA until the polyaniline electrode reached 3.6 V vs. the lithium electrode, and then discharged with a constant current of 0.1 mA until the polyaniline electrode reached 1.7 V vs. the lithium electrode.

Figure 7:
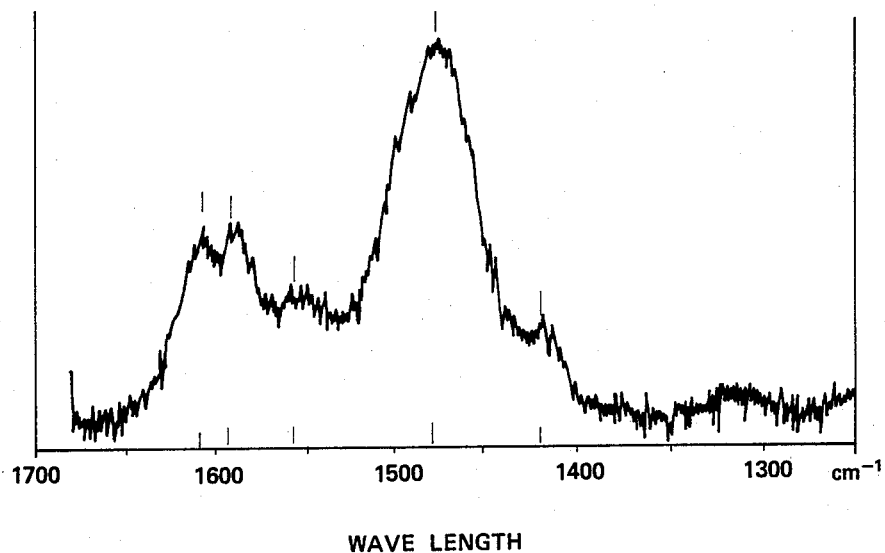
FIG. 7 is a diagram showing the Raman scattering spectrum of the polyaniline of Comparative Example 3 in a discharging state, the Raman scattering using exciting laser light at 514.5 nm.

The polyaniline was analyzed for composition by Raman scattering analysis with exciting laser light at 514.5 nm. As seen from the spectrum shown in FIG. 7, it contained a polyaniline species in quinoid-diimine state having a scattering peak in the range of 1450-1520 $cm^{-1}$. The charged polyaniline which was obtained by charging with a constant current of 0.1 mA until the polyaniline electrode reached 3.6 V vs. the lithium electrode was analyzed for Raman scattering to find that it had no scattering peak in the range of 1300 1350 $cm^{-1}$, but a scattering peak at approximately 1470 $cm^{-1}$. This also confirmed the presence of a quinone-diimine structure.

The battery was charged with a constant current of 0.1 mA until the polyaniline electrode reached 3.6 V vs. the lithium electrode, and then discharged with a constant current of 0.1 mA until the polyaniline electrode reached 2.0 V vs. the lithium electrode. The discharge capacity density was approximately 0 Ah/kg.

COMPARATIVE EXAMPLE 4

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was washed with water and then dried in vacuum.

The polyaniline was analyzed by X-ray photoelectron spectroscopy. The resulting spectrum showed a lower peak at 8-9 eV and a higher peak at 15-20 eV and was thus similar to that reported by P. Snauwaert et al., Synthe. Met., 18, 338 (1987). The conductivity of the polyaniline was measured to be 2 S/cm.

EXAMPLE 4

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was dipped in an aqueous solution containing 1 mol/liter of hydrazine hydrochloride at pH about 1 for 24 hours, again dipped in an aqueous solution containing 30 weight/volume % of hydrazine for 24 hours, washed with methanol, and then dried in vacuum.

Figure 8:
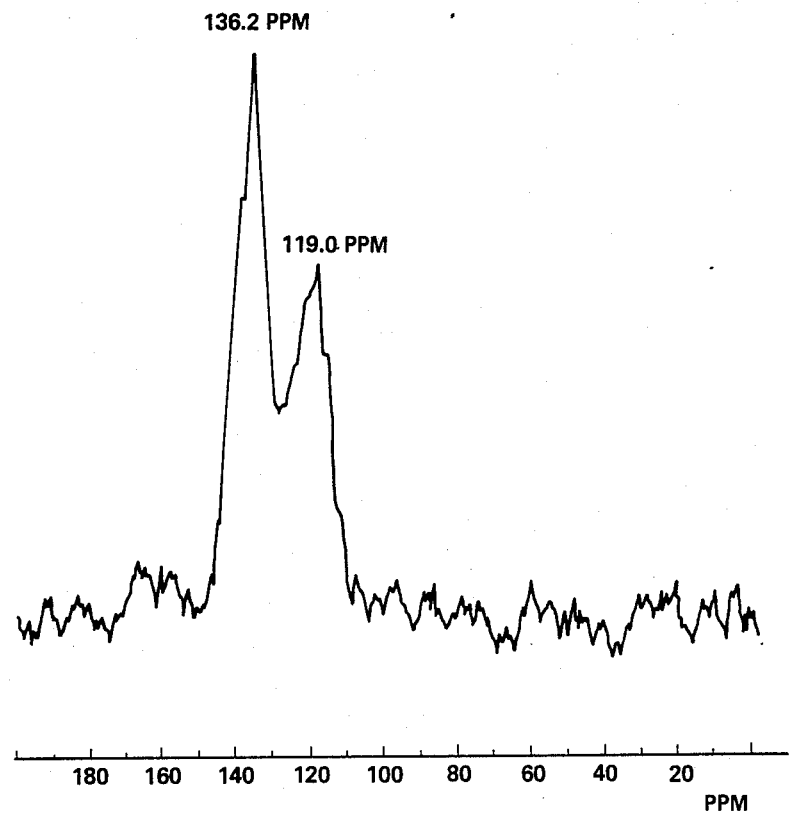
FIG. 8 is a diagram showing the spectrum of the polyaniline of Example 4 by $^{13}C$ solid state high-resolution NMR.

The polyaniline was analyzed by $^{13}C$ solid state high-resolution NMR. As seen from the spectrum of FIG. 8, a peak appeared in the range of 115-120 ppm and another peak appeared in the range of 135-140 ppm. The conductivity of the polyaniline was measured to be $10^{-5}$ S/cm

COMPARATIVE EXAMPLE 5

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was dipped in a 1M sodium hydroxide solution for 24 hours, washed with methanol, and then dried in vacuum.

Figure 9:
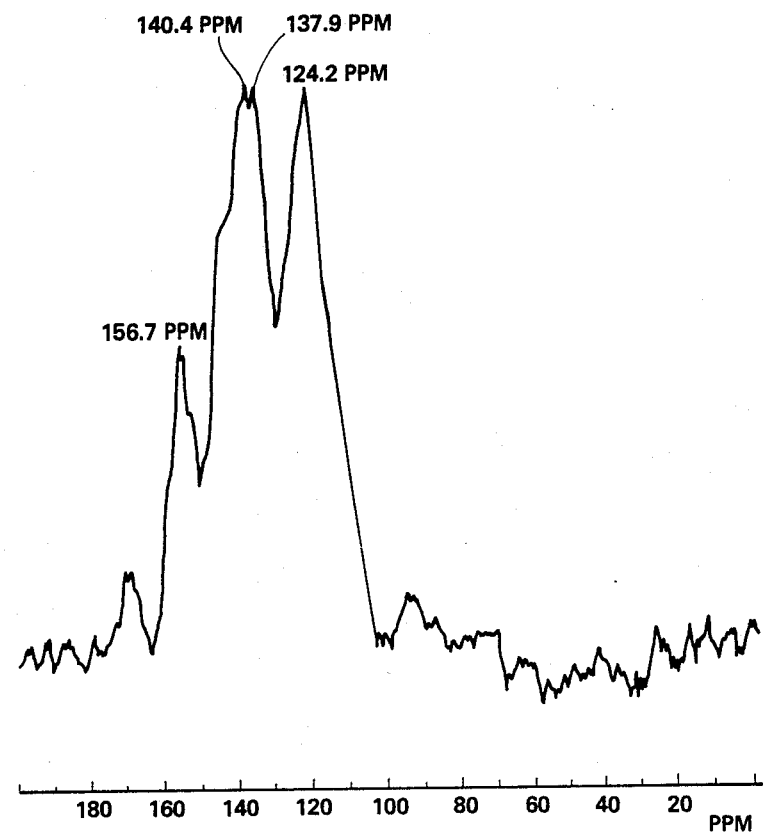
FIG. 9 is a diagram showing the spectrum of the polyaniline of Comparative Example 5 by $^{13}C$ solid state high-resolution NMR.

The polyaniline was analyzed by $^{13}$C solid state high-resolution NMR. As seen from the spectrum of FIG. 9, a peak appeared in each of the ranges of 115-120 ppm, 135-140 ppm, and 140-180 ppm, indicating a substantial content of quinone-diimine state. The conductivity of the polyaniline was measured to be less than $10^{-6}$ S/cm.

COMPARATIVE EXAMPLE 6

A polyaniline was prepared by forming an electrolytic solution containing 5 ml of aniline and 15 ml of 42% borofluoric acid in 30 ml of deionized water and conducting a constant current of 10 mA across the electrodes for 2.8 hours.

The polyaniline was washed with water and then dried in vacuum.

Figure 10:
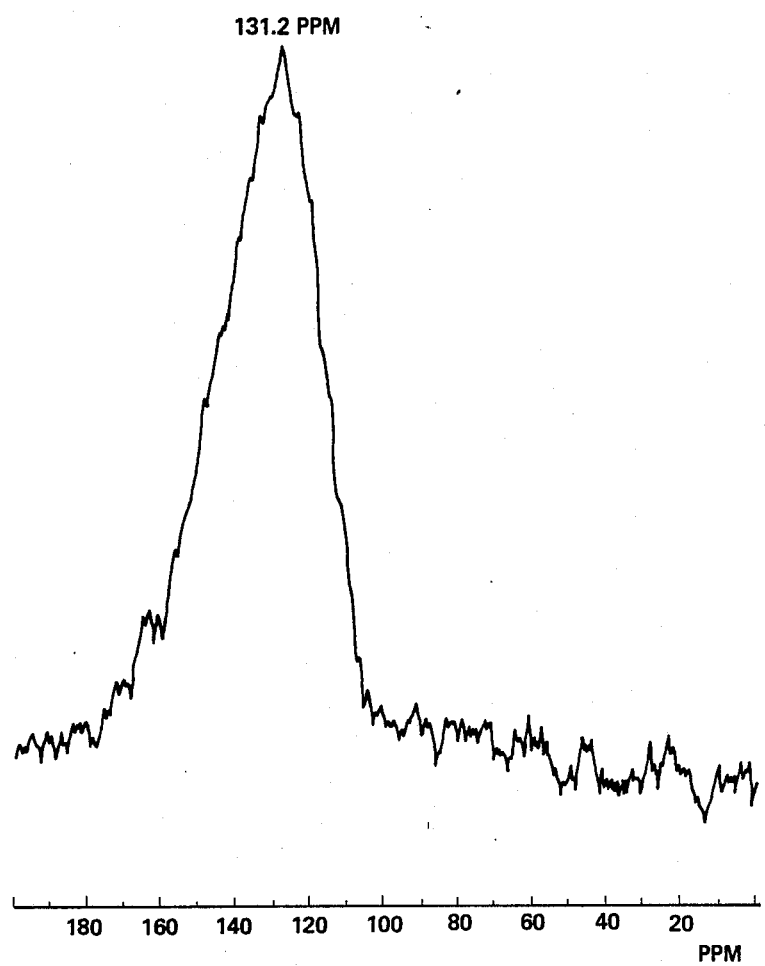
FIG. 10 is a diagram showing the spectrum of the polyaniline of Comparative Example 6 by $^{13}C$ solid state high-resolution NMR.

The polyaniline was analyzed by $^{13}$C solid state high-resolution NMR. As seen from the spectrum of FIG. 10, a single peak appeared at about 130 ppm. The conductivity of the polyaniline was measured to be 2 S/cm. When the polyaniline was kept in a galvanized iron container, the container rusted in 1 week.

Although preferred embodiments of the present invention are described, obviously numerous modifications and variations of the present invention are possible in light of the above teachings. It is therefore to be understood that within the scope of the appended claims, the invention may be practiced otherwise than as specifically described herein.

We claim:

1. A polyaniline in which up to 7 mol % of said polyaniline is present in the benzenoid-ammonium salt state and up to 25 mol % of said polyaniline is present in the quinoid-diimine state, based on the total molar amount of the polyaniline, and wherein said polyaniline predominantly contains a polyaniline in the dope-semiquinone radical state having a higher maximum electron density at 7-9 eV than at 15-20 eV when analyzed by X-ray photoelectron spectroscopy.

2. A polyaniline in which up to 7 mol % of said polyaniline is present in the benzenoid-ammonium salt state and and up to 25 mol % of said polyaniline is present in the quinoid-diimine state, based on the total molar amount of the polyaniline, and wherein said polyaniline exhibits a peak in the range of 140-145 ppm and no peak having an intensity of more than 85% of that of said peak in the range less than 140 ppm in the $^{13}$C solid state high-resolution NMR analysis with a contact time of 1 msec. and a relaxation time of 20 $\mu$sec.

3. A secondary cell which comprises a positive electrode active material in the form of a polyaniline in which up to 7 mol % of said polyaniline is present in the benzenoid-ammonium salt state and up to 25 mol % of said polyaniline is present in the quinoid-diimine state, based on the total molar amount of the polyaniline, and wherein the polyaniline is predominantly in the dope semiquinone radical state having a higher maximum electron density at 7-9 eV than at 15-20 eV when analyzed by X-ray photoelectron spectroscopy.

4. A secondary cell which comprises a positive electron active material in the form of a polyaniline in which up to 7 mol % of said polyaniline is present in the benzenoid-ammonium salt state and up to 25 mol % of said polyaniline is present in the quinoid-diimine state, based on the total molar amount of the polyaniline, and wherein said polyaniline is predominantly in the dope-semiquinone radical state exhibiting a peak in the range of 140-145 ppm and no peak having an intensity of more than 85% of that of said peak in the range less than 140 ppm in a $^{13}$C solid state high-resolution NMR analysis with a contact of 1 msec. and a relaxation time of 20 $\mu$sec.

* * * * *